CERTIFICATE OF CORRECTION.

Patent No. 1,672,210. Granted June 5, 1928, to

EDWIN A. GUSTAFSON.

It is hereby certified that error appears in the printed specification of the above numbered patent requiring correction as follows: The present drawing should be canceled and the drawing containing four figures as shown below should be inserted therefore as part of the Letters Patent;

June 5, 1928. 1,672,210

E. A. GUSTAFSON

SPEEDOMETER DRIVE

Filed June 8, 1927

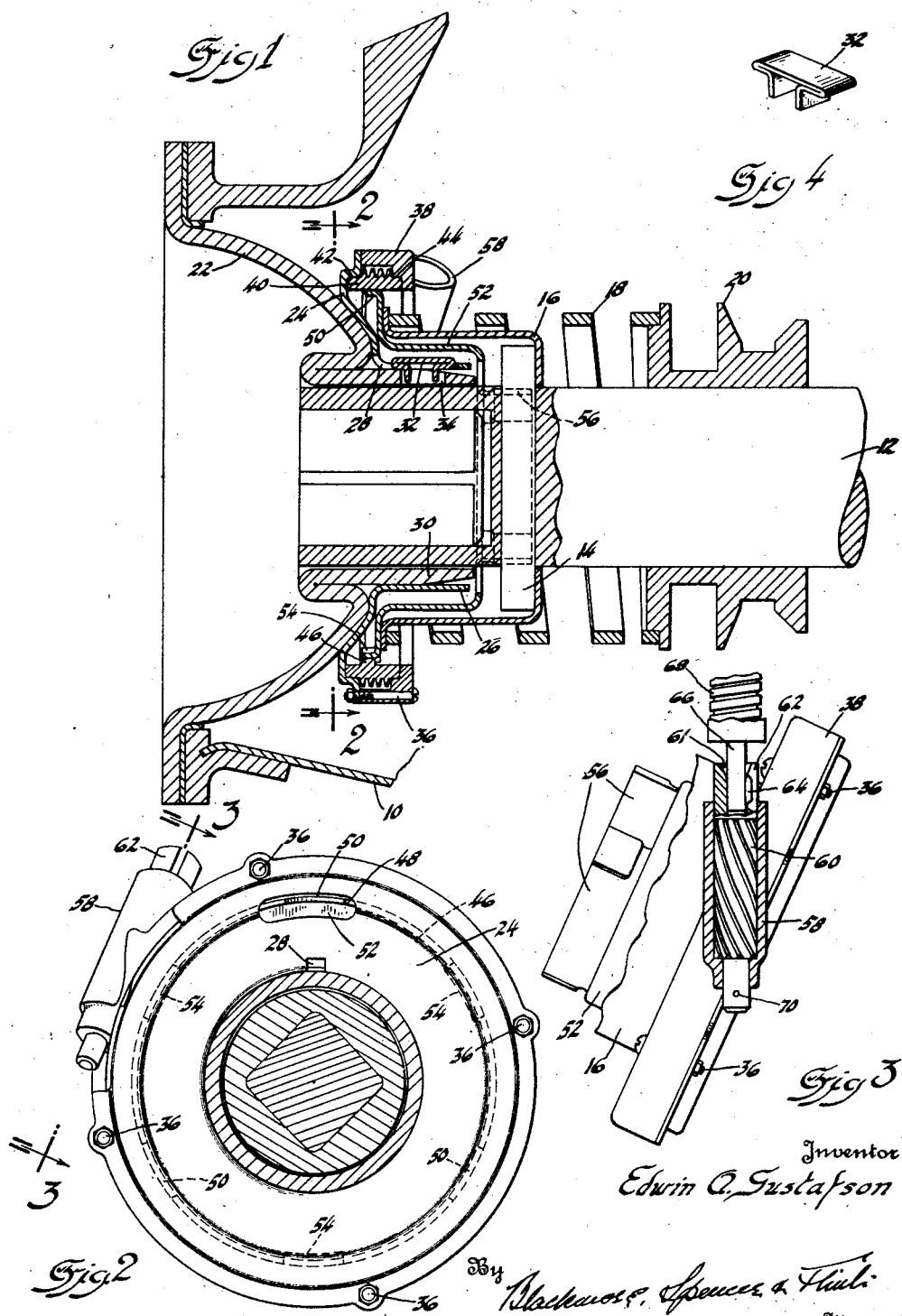

and that the said Letters Patent should be read with this correction therein that the same may conform to the record of the case in the Patent Office.

Signed and sealed this 10th day of July, A. D. 1928.

M. J. Moore,

Patented June 5, 1928.

1,672,210

UNITED STATES PATENT OFFICE.

EDWIN A. GUSTAFSON, OF FLINT, MICHIGAN, ASSIGNOR TO A C SPARK PLUG COMPANY, OF FLINT, MICHIGAN, A COMPANY OF MICHIGAN.

SPEEDOMETER DRIVE.

Application filed June 8, 1927. Serial No. 197,405.

My invention relates to improved speedometer driving mechanism of the type which is intended to be installed inside of a transmission casing of a motor vehicle. It may be installed when the parts of the vehicle are being assembled but it is more particularly intended for installation after the latter has left the factory.

It has for its principal object the provision of such mechanism which may be assembled into a unit before it is inserted in the transmission casing. In other words, the driving and driven gears are held in a definite relation to each other and to their bearing and guiding surfaces at all times, and are not dependent upon exact assembly or variations in dimensions of the transmission parts, as is the case with some types of speedometer drives.

Another object is to provide a speedometer drive which may be easily installed inside a transmission casing without any modification or substitution of the transmission parts.

A still further object is to provide such mechanism in which the driving gear is positively driven from a pin in the transmission shaft, instead of depending upon the frictional engagement of one part with another, as is the case in some speedometer drives.

With the above and other objects in view, my invention will be more clearly understood by referring to the specification and accompanying drawing, in which, Fig. 1 is a fragmentary longitudinal section through a transmission, showing my improved speedometer driving mechanism assembled therein.

Fig. 2 is a section taken on the line 2—2 of Fig. 1.

Fig. 3 is a section taken on the line 3—3 of Fig. 2.

Fig. 4 is a perspective detail view of a key used to lock the drive housing against rotation.

The numeral 10 is used to indicate a transmission casing within which is supported the transmission shaft 12. Held in the shaft is a pin 14 serving as a stop for a collar 16. This collar acts as an abutment for a clutch spring 18 which bears against the clutch operating member 20.

The end of the transmission casing is closed by a member 22 which in this case happens to be the front half of the universal joint housing. In the particular transmission illustrated, the above mentioned parts are the regular equipment. My improved speedometer driving mechanism is so constructed that it can be assembled in conjunction with these parts without modifying or replacing any of them.

It consists of a stamping 24 shaped to conform with the contour of the member 22 and having flange portion 26 in which is a slot 28. This flange portion fits over a sleeve portion 30 of the member 22. A key 32 fits in the slot 28 and engages an oil hole 34 in the sleeve portion 30. The key prevents the stamping 24 from rotating and the flange portion 26 serves to properly center it and prevent radial movement. Secured to this stamping by bolts 36 is a housing 38. Rotatably mounted between the stamping 24 and the housing 38 is a driving gear 40, supported on a bearing surface 42 in the stamping, and on a bearing surface 44 in the housing. On the inside of this gear is a flange 46 provided with notches 48 into which fit a plurality of lugs 50 formed on a driving member 52. Alternately spaced lugs 54 fit inside the flange 46 and serve to tightly hold the driving member 52 in the gear 40 and properly center the driving member. The latter is formed with two arcuate projections 56 adapted to engage the pin 14 so that the driving member 52 will be positively driven and will in turn drive the gear 40. It will be seen that the speedometer drive assembly will be held from axial movement in one direction by the engagement of the stamping 24 with the member 22, and in the opposite direction by engagement of the driving member 52 with collar 16.

Supported in a bearing portion 58 of the housing 38 is a driven gear 60 meshing with the driving gear 40 and having an aperture 61 and a slot 62 at its upper end, adapted to receive the lug 64 of the usual flexible shaft 66, held within the flexible tubing tubing 68. This tubing passes through the transmission cover plate and may be held in the latter in any suitable manner. The driven gear 60 is held in place within the bearing portion 48 by a pin or cotter key 70.

It will be seen that the entire driving mechanism unit may be assembled and tested for free running ability before placing it in the transmission casing. The center distance and angle between the driving and driven gears is definitely determined by the housing 38 and is easily held within close limits. In some forms of somewhat similar drives, the relation of the gears to each other is dependent upon the dimensions or assembly of the transmission parts and any variation in these may cause the gears to mesh improperly, thus shortening their lives considerably.

To assemble this driving unit in the transmission casing, it is necessary to remove the member 22, after which the driving unit may be slipped in place upon the member 22 with the key 32 engaging the oil hole 34. This whole assembly can then be inserted into the transmission casing, so that one of the projections 56 will lie on each side of the pin 14. The member 22 may then be fastened in place in the usual manner. It will be seen that it is not necessary to disturb or change the pin 14, the collar 16, spring 18 or the member 20. Also, the gear 40 is positively driven from the pin 14, and does not depend upon frictional engagement or spring tension, which might cause it to drive the speedometer inaccurately.

Next, the flexible shaft 66 and tube 68 are passed through the transmission cover and the shaft is inserted into the aperture 61 so that the lug 64 will properly engage the slot 62. The transmission cover may then be slipped down into proper position and secured in place.

It will be apparent that I have constructed a drive which may be expected to have a long life due to the fact that the gears mesh properly, and which is easy to install and cheap to construct. The existing transmission parts do not have to be machined in any way or replaced with expensive substitutes. Practically all of the parts employed are stampings, the economy of which is well recognized.

It is thought from the foregoing taken in connection with the accompanying drawing that the construction and operation of my device will be apparent to those skilled in the art, and that various changes in size, shape, and proportion and details of construction may be made without departing from the spirt and scope of the appended claims.

I claim:

1. A speedometer drive comprising, in combination, a transmission casing, a shaft in said casing, a member adapted to close one end of said casing, a driving gear, a housing for said gear, means associated with said member to prevent the rotation of said housing, a pin secured in said shaft, and a driving member engaging said pin and said gear.

2. A speedometer drive comprising, in combination, a transmission casing, a driving shaft in said casing, a member closing one end of said casing, a stamping adapted to bear against said member, means to prevent said stamping from rotating, a housing secured to said stamping, a driving gear rotatably mounted between said stamping and said housing, and means associated with said gear to drive the latter from said shaft.

3. A speedometer drive comprising, in combination, a transmission casing, a driving shaft in said casing, a member closing one end of said casing, a stamping adapted to fit against said member and be held in position by the latter, means locking said stamping and said member together to prevent rotation of said stamping, a housing secured to said stamping, a driving gear rotatably mounted in said stamping and said housing, and a driving member serving to drive said gear from said shaft.

4. A speedometer drive comprising, in combination, a transmission casing, a driving shaft in the casing, a member closing one end of the casing, a stamping adjacent said member, means associated with said member to prevent rotation of said stamping, a housing secured to said stamping, a driving gear rotatably mounted between said stamping and said housing, a driven gear journalled in said housing, and a driving member serving to drive said driving gear from said shaft.

5. A speedometer drive comprising, in combination, a transmission casing, a driving shaft in the casing, a pin held in said shaft, a member closing one end of said casing, a stamping adjacent said member, means associated with said member to prevent rotation of said stamping, a housing secured to said stamping, a driving gear rotatably mounted between and journalled in said stamping and said housing, a driven gear journalled in said housing, and a driving member engaging said pin and said driving gear for the purpose of driving the latter.

In testimony whereof I affix my signature.

EDWIN A. GUSTAFSON.

CERTIFICATE OF CORRECTION.

Patent No. 1,672,210. Granted June 5, 1928, to

EDWIN A. GUSTAFSON.

It is hereby certified that error appears in the printed specification of the above numbered patent requiring correction as follows: The present drawing should be canceled and the drawing containing four figures as shown below should be inserted therefore as part of the Letters Patent;

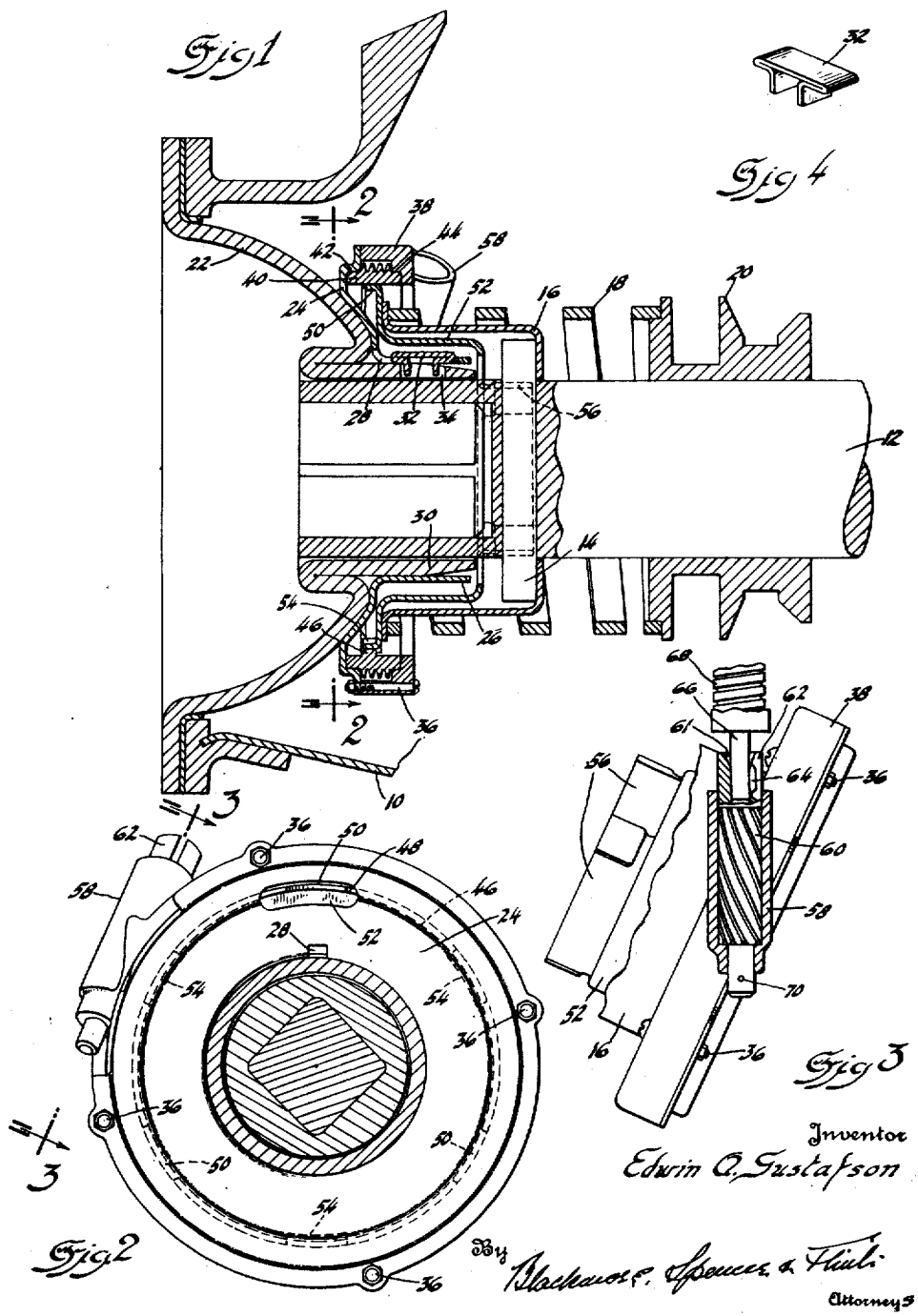

and that the said Letters Patent should be read with this correction therein that the same may conform to the record of the case in the Patent Office.

Signed and sealed this 10th day of July, A. D. 1928.

(Seal)

M. J. Moore,
Acting Commissioner of Patents.